(12) United States Patent
Fielding et al.

(10) Patent No.: US 6,181,696 B1
(45) Date of Patent: Jan. 30, 2001

(54) METHOD AND APPARATUS FOR CONTROLLING NETWORK SWITCHES

(75) Inventors: William S. Fielding; Christopher R. Plater, both of Vancouver (CA)

(73) Assignee: International Business Machines Corporation, Armonk, NY (US)

(*) Notice: Under 35 U.S.C. 154(b), the term of this patent shall be extended for 0 days.

(21) Appl. No.: 08/904,775

(22) Filed: Aug. 1, 1997

(51) Int. Cl.[7] .................................................. H04L 12/28
(52) U.S. Cl. .......................... 370/360; 370/398; 370/422; 379/242
(58) Field of Search ................................. 370/410, 360, 370/384, 385, 395, 396, 398, 422, 377, 257, 463; 707/104; 379/242, 229, 230, 207, 93.05

(56) References Cited

U.S. PATENT DOCUMENTS

| 5,625,681 | * | 4/1997 | Butler, II | 379/207 |
|---|---|---|---|---|
| 5,651,059 | * | 7/1997 | Morgan et al. | 379/207 |
| 5,664,010 | * | 9/1997 | Walker et al. | 379/207 |
| 5,737,404 | * | 4/1998 | Segal | 379/230 |
| 5,768,361 | * | 6/1998 | Cowgill | 379/229 |
| 5,793,761 | * | 8/1998 | Fritsche | 370/377 |
| 5,799,317 | * | 8/1998 | He et al. | 707/104 |
| 5,864,542 | * | 1/1999 | Gupta et al. | 370/257 |
| 5,875,234 | * | 2/1999 | Clayton et al. | 379/93.05 |
| 5,907,610 | * | 5/1999 | Onweller | 379/242 |

* cited by examiner

*Primary Examiner*—Hassan Kizou
*Assistant Examiner*—John Pezzlo
(74) *Attorney, Agent, or Firm*—Kenneth A. Seaman

(57) ABSTRACT

An apparatus for controlling network switches which includes a central network controller node having a call task for booking and executing calls by setting up the switches that interconnect a first terminal and a second terminal and a switch master task for receiving commands to control all of the switches in the network, maintaining status information for all of said switches and distributing requests for particular connections. A switch controller task is coupled to the switch master task for converting input instructions to a generic switch into commands for hardware switches. In response to a client request, the central network controller communicates with the switch controller task to convert commands for the generic switch to commands for the hardware switch and to create a connection between the first terminal and the second terminal.

11 Claims, 3 Drawing Sheets

METHOD AND APPARATUS FOR CONTROLLING NETWORK SWITCHES

RELATED APPLICATIONS

The following patent applications are related to the application and are incorporated herein by reference:

| Title | Serial No. | Filing Date |
|---|---|---|
| Method and Apparatus For Controlling Elementary Stream Data Flow | 08/904,773 | 8/1/97 |
| Multiplexer for Multiple Media Streams | 08/904,813 | 8/1/97 |
| Frame Buffer for Multimedia Terminal | 08/904,819 | 8/1/97 |
| Isolation of Multimedia Signals for Transmission and Processing Within a Multimedia SN 08/904,812 Terminal | 08/904,778 | 8/1/97 |
| Internet Application Access Server Apparatus and Method | 08/905,197 | 8/1/97 |
| Network Communication Services Method and Apparatus | 08/904,939 | 8/1/97 |
| Method and Apparatus for Controlling Network Switches | 08/904,775 | 8/1/97 |
| Method and Apparatus for Maintaining Directory Services for a Video Transmission Network | 08/904,774 | 8/1/97 |
| Method and Apparatus for Controlling Access in a Video Distribution Network --. | 08/904,716 | 8/1/97 |

FIELD

The present invention relates to a network switching system for controlling analog and digital switches utilizing an architecture that allows control by a client through a central network controller to one or more switch controllers. More particularly, the present invention relates to a method and apparatus for controlling network switches which is independent of the type and manufacture of the switch.

BACKGROUND

Various types of networks involving switches are in common use such as public and private telephone networks, local area networks (LAN) and wide area networks (WAN). LAN and WAN networks are digital and generally use asynchronous transfer mode (ATM) signals whereas telephone networks typically use analogue or synchronous digital signals (SONET). In ATM systems, the transmitted signals themselves carry the information that defines the destination of its payload. Similarly, in telephone systems, either analogue multitone signals define the number being called which is used to set up the connection or, for digital lines, coded frames of data are transmitted synchronously to define the desired connection. In other networks, such as token ring systems, data is passed around sequentially from one station to the next until the header information in that cell is recognized. In telephone networks, a host of central offices control communications with groups of subscribers either on analog lines or digital lines. Transmissions can take place between subscribers under the control of the same central office or between subscribers controlled by different central offices.

Broadband telecommunications networks involve networks containing hardware switches of various types and, for a given type, of various manufacturers. Such a network could contain frame, ATM and/or baseband analogue switches. For example, the switches in one city could be primarily analogue switches while those in another city could contain ATM switches or a mixture of ATM and analogue switches. In addition, the ATM switches could be made by various manufacturers as could the analogue switches. In general switches of one manufacturer are controlled differently by different protocols from those of other manufacturers and, in addition, could be configured differently. In order to set up a call the switch controller would have to know the protocol for each of the different switches involved. Moreover, if a given switch were changed to a switch of a different manufacturer, the protocol for that switch and its configuration, i.e. by a serial port or parallel ports, would have to be changed. Obviously, such a system is complex and inefficient.

In order for a call from one location to be connected to another location the system must be able to control each different make and type of switch in the path.

Obviously, there is a need for a simpler, switch independent method of setting up such a call.

SUMMARY OF THE INVENTION

According to the invention there is provided an apparatus for controlling network switches which includes a central network controller node having a call task for booking and executing calls by setting up the switches that interconnect a first terminal and a second terminal and a switch master task for receiving commands to control all of the switches in the network, maintaining status information for all of said switches and distributing requests for particular connections. A switch controller task is coupled to the switch master task for converting input instructions to said generic switch into commands for hardware switches. In response to a client request, the switch master task communicates with the switch controller task to convert commands for the generic switch to commands for the hardware switch and to create a connection between the first terminal and the second terminal.

Preferably, the network is a broadband telecommunications network.

According to another aspect of the invention there is provided a method of controlling hardware switches in a network, which includes generating a generic switch and inputting control information into the generic switch so as to request a particular hardware connection, and converting the control information into hardware specific instructions so as to cause hardware switches to interconnect a first terminal to a second terminal.

BRIEF DESCRIPTION OF THE DRAWINGS

Further features and advantages will be apparent from the following detailed description, given by way of example, of a preferred embodiment taken in conjunction with the accompanying drawings, wherein.

DETAILED DESCRIPTION WITH REFERENCE TO THE DRAWINGS

Figure 1:
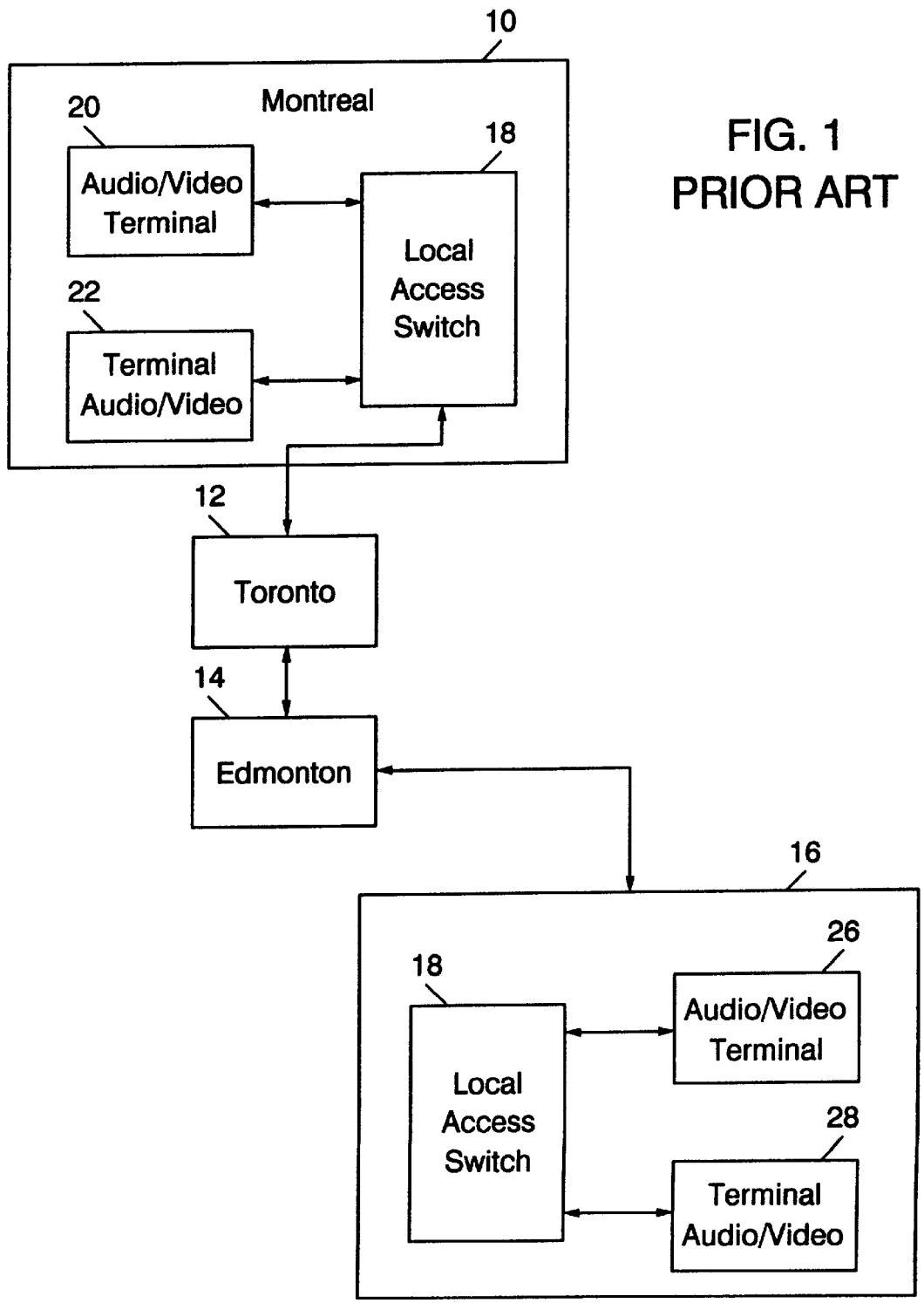
FIG. 1 is a schematic block diagram of the architecture of a broadband switching network.

Referring to FIG. 1 a typical broadband switching network has a number of local access switches 18 in various cities. For example, there may be two terminals 20 and 22 in Montreal 10 connected to a local access switch 18 in that city with connections to Toronto 12, Edmonton 14 and Vancouver 16 with one or more backbone switches (not shown) which are large switches that connect local access switches 18 between cities. Another pair of terminals 26 and 28 connect to the local access switch 18 in Vancouver 16.

Should a caller in Montreal 10 via terminal 20 wish to call a terminal 26 in Vancouver 16 it is necessary to set up all of the switches so that the caller has a way of getting through to terminal 26 in Vancouver 16. Since different switches are controlled in different ways with different protocols and different configurations, it would be necessary for the central network controller (not shown) which controls the local access switch 18 in Montreal 10 to know the protocol and configuration of each switch in the path to the terminal 26.

Figure 2:
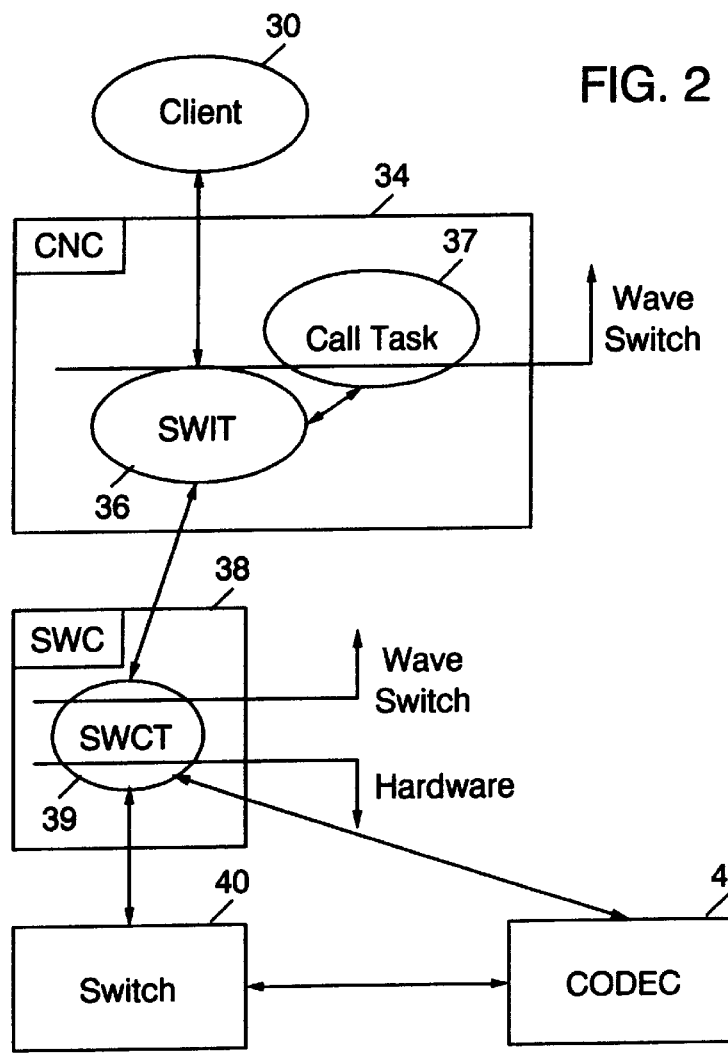
FIG. 2 is a schematic diagram of a broadband switching network according to the present invention.

Referring to FIG. 2 there is shown an architecture which allows the characteristics of each switch in a system to be insulated from the rest of the network. In this case a central network controller node (cnc) 34 defines a group of cooperative tasks whose purpose is to control the network. The central network controller node 34 contains a set of software called a call task 37 which is responsible for both scheduling calls and determining if the resources are available for a particular call to take place at a particular time. It is also responsible for executing calls, for advising the terminals at either end that they are involved in a call and for setting up the switches that it has under its control. The call task 37 acts as a client of the switch control subsystem providing the instructions to the switch master task 36 to set up a generic switch. The cnc 34 also contains a switch master task 36 which provides a single point of access for clients of the switch control subsystem. It receives commands to control all of the switches in the network and maintains status information for all of them. It distributes requests and performs retries on all failed connections. The switch master task 36 is also responsible for maintaining the current state of all of the network switches, so that these can be restored to their proper state in the case of a loss of communications or switch-wide failure.

Each switch controller node 38 is responsible for the task of controlling one of the network switches. It contains a switch controller task 39 whose primary mission is the conversion of generic switch control commands into commands that control a particular kind of switch hardware. The switch controller task 39 is responsible for doing surveillance over the switches it controls, and reporting failures to the switch master task 36 using generic switch status reports. The management user interface within the switch controller node 38 is responsible for presenting a network operator with a view of the status of the switches which are controlled by a switch controller task 39. The switch controller task 39 is responsible for providing status updates to the management user interface. The switch controller task 39 is responsible for configuring and controlling encoder/decoder (codec) units 41 or terminals which are attached to the switch it controls. Codec 41 can convert a signal from one form to another by coding and decoding it. For example, a codec can convert between MPEG II video and analogue baseband video. Thus, a codec 41 would be used in going from analogue to digital in a mixed environment of analogue switches and digital switches. Codecs 41 may or may not coexist with a switch or may exist on some ports and not on others.

Figure 3:
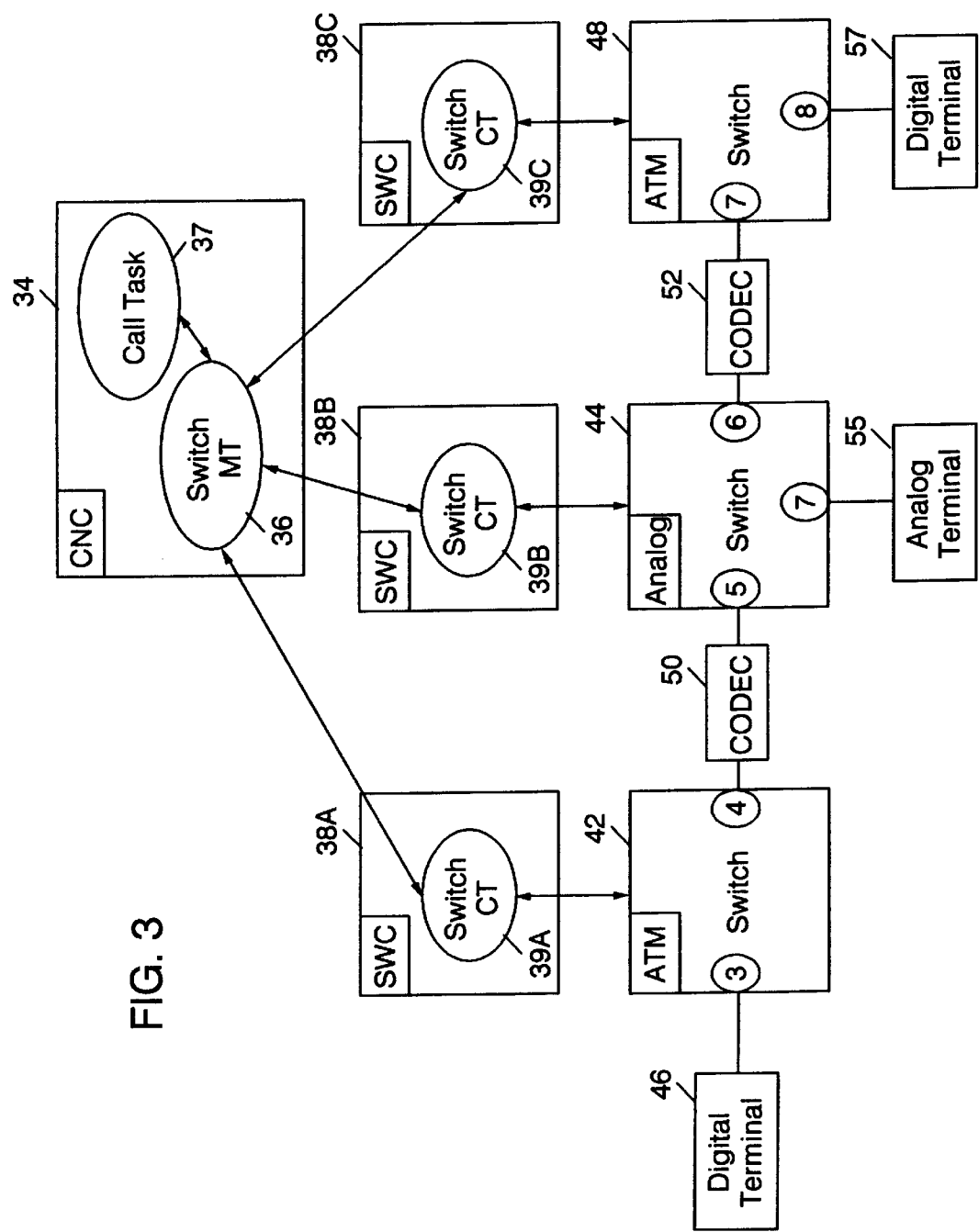
FIG. 3 is a schematic diagram of a broadband switching network which includes a pair of switch controller, associated hardware switches and terminals.

Referring to FIG. 3, a more expanded schematic of the system involves the central network switching controller node 34 and call task 37 receiving a request from a client 30 to create a generic switch. The model that the call task 37 has is one having switch controller nodes 38A and 38B. Switch controller task 39A of switch controller node 38A controls a hardware switch 42 to which there is coupled to a port 3 a terminal 46 and switch controller task 39B of switch controller node 38B controls a hardware switch 44 to which there is coupled to a port 7 a terminal 55. Port 4 of hardware switch 42 is connected to port 6 of hardware switch 44. Thus, in order to complete the call the switch master task controller 36 and call task 37 need to cause an internal connection between ports 3 and 4 of switch 42 and between ports 6 and 7 of switch 44.

The switch master task 36 is responsible for distributing the commands to the correct locations so as to make the desired switching operation take place. It is the switch controller task 39A that must translate the commands from the central network controller node 34 into a proper command that causes the hardware to make the connection. The commands to hardware switch 42 could be totally different from those to hardware switch 44.

Figure 4:
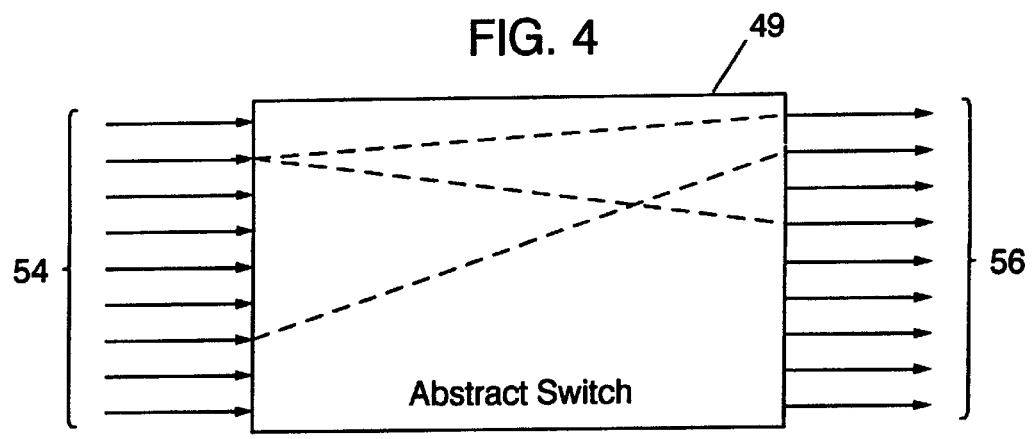
FIG. 4 is a schematic diagram of an abstract or generic switch.

Referring to FIG. 4 the generic or abstract switch 50 is modeled as a black box device with a number of input ports 54 and output ports 56. Each such switch is uniquely identified within the network, and each of the ports 54 and 56 are uniquely defined within the switch 50. The switch has the ability to make a connection between any of the output ports 56 to any one of the input ports 54.

The following are the C-language declarations for the data structures used to represent the abstract switch 50. This structure represents a particular connection. The input and output ports are the ports on the switch. The portState, callID, and callType information provide state and call information for the connection.

```
/*
* A) Name:        SWI_CONN_T
* B) Description: Switch connection information
* C) Notes:
*
*                 callType is a member of the enumeration:
*                 nif_call_type_enum, which is generated from
*                 nif_res_msg.x
*
*/
typedef struct
{
    U1_T            inputPort;
    U1_T            outputPort;
    U2_T            portState;
    U4_T            callID;
    U2_T            callType:
} SWI_CONN_T;
```

This structure collects a list of connections together. Such a list of connections describes the dynamically changing connection state of the abstract switch.

```
/*
* A) Name:        SWI_MATRIX_T
* B) Description: Switch matrix information
*/
typedef struct
{
    U1_T            nPorts;
```

```
                                        -continued

SWI_CONN_T         port [ SWI_MAX_SIZE + 1];
} SWI_MATRIX_T;
```

This structure contains the static portion of a switch definition. It includes information about the switch's ID, its state, as well as polling related information.

```
/*
 * A) Name:        SWI_DEFN_T
 * B) Description: Switch definition
 */
typedef struct
{
  U2_T           id;             /* switch ID */
  SWI_STATE_T    swiState;       /* switch state */
  U4_T           pollTimeout;    /* time in seconds to poll switch */
  U2_T           timeoutLength;  /* time to wait for a switch reply */
  SWI_LEVEL_T    swiLevel;       /* Level to use for connections */
} Swi_DEFN_T;
```

This structure combines the static switch definition information together with the dynamic portion to make a complete abstract switch definition.

```
/*
 * A) Name:        SWI_T
 * B) Description: Switch definition
 */
typedef struct
{
  SWI_DEFN_T     defn;           /* Switch defn */
  SWI_MATRIX_T   matrix;         /* Switch Matrix */
} SWI_T;
```

The following operations can be performed by a client on an abstract switch described by the above structures:
  A. Create the switch. This is how the static portion of the switch definition is set up.
  B. Query for switch information. This is the way a client of the switching subsystem retrieves a copy of the switch information in a SWI_T.
  C. Make a connection or disconnection. This is how the client makes connections on the generic switch.

Creating Switches
  1. The client calls the swi_create_switch()function. This causes a message to be sent to the switch control subsystem indicating the switch to be created.
  2. The switch master receives the request and determines the switch controller associated with the abstract switch in question.
  3. The switch master creates an entry for the new switch in the list of active switches it maintains.
  4. The request to create the switch is forwarded to the switch controller.
  5. The switch controller receives the request to create the switch and stores the associated configuration information in the list of active switches it maintains.
  6. The switch controller attempts to open the communications channel it will use to control the physical switch that corresponds to the abstract switch described in the creation request.

Making Connections
  1. The client calls the swi_set_conns()function. This causes a message to be sent to the switch control subsystem indicating the switch to be used and the connection(s) to be made.
  2. The switch master receives the request and forwards it to the appropriate switch controller.
  3. The switch controller receives the command and processes each of the connections(s) as follows:
  4. Each connection is expressed as a command to connect an input port to an output port on the abstract switch. The switch controller must map the abstract switch ports onto the corresponding physical ports of the real switch. On a typical analog switch, this mapping is such that port 0 of the abstract switch corresponds to the first port on the physical switch, port 1 on the abstract switch to the second port, and so on. In the case of ATM switch, each abstract port is typically mapped to a virtual path and virtual channel pair on a physical port, so the mapping is typically described in the switch controller's configuration.
  5. Once the physical ports have been determined, the switch controller issues the command which connects those ports together on the switch it controls.
  6. The switch controller obtains the result of the connection attempt, and converts the switch-specific result report into the abstract.
  7. Once all of the connection request have been processed, a reply is sent to the switch master indicating which connection requests were successful. This is done using the state information associated with each connection of the abstract switch.
  8. The switch master forwards the report to the client.

As a concrete example consider the switch of Pro-Bel of Berkshire, England, a well known switch manufacturer.

Processing a Create message by the Pro-Bel switch controller
  1. The request to create the switch arrives.
  2. The switch controller receives the request to create the switch and stores the associated configuration information in the list of active switches it maintains.
  3. The switch controller opens the serial device which it uses to exchange messages with the switch.
  4. The switch controller sends a "RS" message to the switch to cause it to reset.

Processing a Connect message by the Pro-Bel switch controller
  1. The switch controller receives a message indicating that it should make a series of connections. The switch controller processes each connection as follows:
  2. Convert the input and output port numbers from the abstract switch's 0-based numbering scheme to the physical hardware's 1-based scheme by adding 1 to the port numbers.
  3. For each connection to be made, the switch controller sends a "S,A,o,i" command, where "o" and "i" are replaced with the physical output and input port numbers respectively.
  4. Examine the reply from the switch to ensure that none of the error messages are returned.
  5. Set the status for the current connection in the reply message to "OK" if no error message was returned, or to "Damaged" if an error message was returned.
  6. When all connections have been processed, return the result to the switch master.

The code for the switch controller 38 and adapter code that allows the latter to control switches of the specific manufacturers of Phillips Broadcast Telecommunications System (BTS) and Pro-Bel Limited, of Berkshire, England is incorporated into the present application and marked as Schedule A.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. An apparatus for controlling network switches comprising:
    (a) a central network controller node having a call task for booking and executing calls by setting up the switches that interconnect a first terminal and a second terminal and a switch master task for receiving commands to control all of the switches in the network, maintaining status information for all of said switches and distributing requests for particular connections;
    (b) a switch controller task for converting control commands for a generic switch into commands that control a particular kind of switch hardware wherein said generic switch includes a plurality of input ports and a plurality of output ports and a conversion means for translating manipulations of said generic switch into appropriate control commands for a hardware switch;
    wherein in response to a client request, the central network controller communicates with said switch controller task to convert commands for a generic switch to commands for said hardware switch and to create a connection between said caller and said call destination.

2. An apparatus according to claim 1, wherein said hardware switch includes an ATM switch.

3. An apparatus according to claim 1, wherein said network is a broadband telecommunications network.

4. An apparatus for controlling broadband telecommunications network switches comprising:
    (a) a central network controller node having a call task for booking and executing calls by setting up the switches that interconnect a first terminal and a second and a switch master task for receiving commands to control all of the switches in the network, maintaining status information for all of said switches and distributing requests for particular connections;
    (b) a plurality of switch controller tasks for converting control commands for a generic switch into commands that control associated hardware switches, wherein said generic switch has a plurality of input ports and a plurality of output ports and a converter operative to reconfigure connections between said input ports and said output ports to translate the control commands for said generic switch into commands for hardware switches coupled to an associated switch controller task so that the switch controller tasks, in response to a client request to the central network controller, converts commands for the generic switch to commands for said hardware switches to create a connection between said a first of a plurality of terminals and a second of said plurality of terminals.

5. An apparatus according to claim 4, wherein said hardware switches include analogue switches and digital switches.

6. An apparatus according to claim 5, wherein said digital switches include ATM switches.

7. A method of controlling hardware switches in a network, comprising:
    (a) generating generic switch which has a plurality of input ports and a plurality of output ports and a converter operating to reconfigure connections between said input ports and said output ports into appropriate connections for any specific hardware switch;
    (b) inputting control information into said generic switch so as to request hardware connections for specific ones of the appropriate hardware switches; and
    (c) converting said control information into hardware specific instructions so as to cause the hardware switches to interconnect a first terminal to a second terminal.

8. A method according to claim 7, wherein said control information includes information which when converted causes codecs to interface between analogue and digital signals in said network.

9. A method according to claim 8, wherein said switches have a plurality of different protocols and different configurations.

10. A method according to claim 7, wherein said switches include both analogue and digital switches.

11. A method according to claim 10, wherein said switches are ATM switches.

* * * * *